No. 786,814. Patented April 11, 1905.

UNITED STATES PATENT OFFICE.

THOMAS HUNTINGTON AND FERDINAND HEBERLEIN, OF LONDON, ENGLAND.

PROCESS OF TREATING SULFID ORES OR COMPOUNDS PREPARATORY TO SMELTING.

SPECIFICATION forming part of Letters Patent No. 786,814, dated April 11, 1905.

Application filed June 26, 1903. Serial No. 163,275.

*To all whom it may concern:*

Be it known that we, THOMAS HUNTINGTON, a citizen of the United States of America, and FERDINAND HEBERLEIN, a subject of the German Emperor, both residing at London, England, have invented an Improved Method of Oxidizing Sulfid Ores Preparatory to Smelting the Same, of which the following is a specification.

This invention relates to the treatment of sulfid ores, mattes, or metalliferous compounds, particularly lead, zinc, copper, iron, and like sulfids, with a view to their thorough and economical desulfurization and oxidation and for the purpose of rendering their condition specially adapted to the smelting process to which they are subsequently subjected.

The invention more particularly consists in an improvement upon the process described in the specification of our United States Patent No. 600,347. According to the process therein described the sulfid ores are first subjected to a preliminary roast in a suitable furnace with access of air. The partially-roasted material is then allowed to cool down to a dull red heat and is afterward removed to a converter or other suitable receptacle, where it is subjected to an induced current of air for the completion of the oxidation. As the result of the practical working of this process we have found that after roasting the ore until the proportion of sulfur remaining therein is such as to avoid a too rapid fusion in the subsequent blowing operation the economical and technical results are in some instances materially improved by greatly increasing the cooling process, even to the extent of suddenly reducing the temperature of the ore to that of the atmosphere. In carrying out this cooling operation we prefer to apply water, not merely with the object of accelerating the operation, but of bringing about certain chemical reactions in addition to changing the physical condition of the ore. Not only is some sulfatization effected, but the anhydrous sulfates of the metals combine with their water of solution, so that $ZnSO_4$ becomes $ZnSO_4 7Aq$, $CuSO_4$ becomes $CuSO_4 5Aq$, and $FeSO_4$ becomes $FeSO_4 - 7Aq$. In either of these cases the product assumes a condition in which it is peculiarly suited to the treatment to which it is subsequently subjected. This treatment consists in placing the water-cooled material in a receptacle, in which it is reheated and through which a current of air is caused to pass. In order to start the necessary combustion, a layer of hot fuel or of hot ore containing sulfur is placed in the bottom of the receptacle. The current of air assists and augments the heat thus furnished, with the effect that the sulfur is oxidized and sulfurous-acid gas is given off until the desulfurization of the ore is complete, whereupon the roasted ore, together with the gangue matter, is transformed into a compact mass ready for transference to the blast-furnace for the reduction of the metal.

To increase the fusibility of the ores treated, limestone, silica, or oxid of iron may be added; but this is not in all cases necessary. Indeed, one of the advantages resulting from suddenly and greatly reducing the temperature with the aid of water is that the addition of calcium oxid or other suitable oxid, as described in the specification of our aforesaid patent and as mentioned above, may in many instances be dispensed with.

According to our improved process it suffices to roast the ore until the proportion of sulfur contained therein is reduced to twelve per cent., while according to the process described in the patent above referred to it is necessary with some classes of ore to roast the ore until the proportion of sulfur is reduced to about eight per cent. It will thus be seen that a saving of about twenty-five per cent. in the fuel, labor, and time required may be accomplished by the employment of the improved process described herein.

By the method of treatment described we obtain a product which is not only better roasted, but is in a physical condition better suited to subsequent treatment, which results in an important economy in the cost of working.

It will be understood that when referring to sulfid ores we include compounds of the same, whether in their natural or partially-prepared state.

What we claim as our invention, and desire to secure by Letters Patent of the United States, is—

1. The herein-described process of oxidizing sulfid ores preparatory to their treatment for the reduction of the metal contained therein, such process consisting in heating and working the ore until a portion of the sulfur is removed, rapidly cooling the ore down to atmospheric temperature or thereabout, restarting combustion in the mass and forcing air therethrough for the purpose of further desulfurizing and oxidizing the same, substantially as set forth.

2. The herein-described process of oxidizing sulfid ores preparatory to their treatment for the reduction of the metal contained therein, such process consisting in heating and working the ore until a portion of the sulfur is removed, rapidly cooling the ore with water, restarting combustion in the mass and forcing air therethrough for the purpose of further desulfurizing and oxidizing the same, substantially as set forth.

3. The herein-described process of oxidizing sulfid ores preparatory to their treatment for the reduction of the metal contained therein, such process consisting in heating and working the ore until a portion of the sulfur is removed, rapidly cooling the ore with water down to atmospheric temperature or thereabout, restarting combustion in the mass and forcing air therethrough for the purpose of further desulfurizing and oxidizing the same, substantially as set forth.

4. The herein-described process of oxidizing sulfid ores preparatory to their treatment for the reduction of the metal contained therein, such process consisting in heating and working the ore until the proportion of sulfur contained therein is reduced to twelve per cent. or thereabout, rapidly cooling the ore with water down to atmospheric temperature or thereabout, restarting combustion in the mass and forcing air therethrough for the purpose of further desulfurizing and oxidizing the same, substantially as set forth.

In testimony whereof we have hereunto set our hands in the presence of two subscribing witnesses.

THOMAS HUNTINGTON.
FERDINAND HEBERLEIN.

Witnesses:
H. D. JAMESON,
A. NUTTING.